(12) United States Patent
Breuer et al.

(10) Patent No.: US 8,150,398 B2
(45) Date of Patent: Apr. 3, 2012

(54) HANDOVER OF A USER EQUIPMENT WITH FORWARDING AND REUSING A USER EQUIPMENT CONFIGURATION

(75) Inventors: Volker Breuer, Bötzow (DE); Demian Martos-Riano, Berlin (DE); Thomas Ulrich, Bad Dürkheim (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/674,002

(22) PCT Filed: Aug. 21, 2008

(86) PCT No.: PCT/EP2008/060957
§ 371 (c)(1),
(2), (4) Date: Sep. 22, 2010

(87) PCT Pub. No.: WO2009/024603
PCT Pub. Date: Feb. 26, 2009

(65) Prior Publication Data
US 2011/0009119 A1 Jan. 13, 2011

(30) Foreign Application Priority Data
Aug. 21, 2007 (EP) .................................. 07016382

(51) Int. Cl.
*H04W 36/00* (2009.01)
*H04W 4/00* (2009.01)
(52) U.S. Cl. ......... 455/436; 455/437; 455/438; 370/331
(58) Field of Classification Search .... 455/432.1–432.3, 455/436–440, 450, 452.2, 466, 509, 513–514, 455/63.2, 67.11, 550.1, 552.1, 556.2, 560–561, 455/418, 422.1, 423–425, 524–525; 370/328–329, 331–333, 338, 341, 349–350, 252, 254
See application file for complete search history.

(56) References Cited

U.S. PATENT DOCUMENTS
7,164,654 B2 * 1/2007 Hunzinger et al. ........... 370/230
(Continued)

OTHER PUBLICATIONS

3GPP TSG-RAN3 Meeting #55, Samsung: "Use of AS-configuration upon handover and connection establishment, R2-062904" [Online] Oct. 2006, pp. 1-4, XP002469234, Seoul, Korea Retrieved from the Internet: URL:www.3gpp.org> [retrieved on Feb. 15, 2008] 2.2 Use upon intra LTE handover.

(Continued)

*Primary Examiner* — Meless Zewdu
(74) *Attorney, Agent, or Firm* — Harrington & Smith

(57) ABSTRACT

It is described a method for handing over a User Equipment from a first to a second base station of a telecommunication network. The described method includes establishing a first connection between the User Equipment and the first base station, arranging a current configuration of the User Equipment with the first base station, forwarding the current configuration to the second base station via a terrestrial interface, establishing a second connection between the User Equipment and the second base station, and reusing the forwarded configuration for the operation of the User Equipment, when the User Equipment is served by the second base station. A set of configuration parameters of the User Equipment is known by the first and the second base station as a default configuration and the current configuration of the User Equipment is forwarded from the first base station to the second base station by solely forwarding configuration parameters deviating from the default configuration.

20 Claims, 1 Drawing Sheet

U.S. PATENT DOCUMENTS

| | | | |
|---|---|---|---|
| 7,181,218 B2 * | 2/2007 | Ovesjo et al. | 455/436 |
| 7,254,392 B2 * | 8/2007 | Kauhanen | 455/436 |
| 7,801,531 B2 * | 9/2010 | Koo | 455/437 |
| 2005/0111369 A1 * | 5/2005 | Mangin et al. | 370/236.1 |
| 2006/0040645 A1 * | 2/2006 | Grilli et al. | 455/412.1 |
| 2007/0286123 A1 * | 12/2007 | Semper | 370/331 |
| 2009/0047955 A1 * | 2/2009 | Frenger et al. | 455/436 |

OTHER PUBLICATIONS

3GPP TSG-RAN WG2 Meeting #55, Huawei: "LTE Handover preparation" [Online] Oct. 2006, pp. 1-5, XP002469235, Seoul, Korea, Retrieved from the Internet: URL:www.3gpp.org> [retrieved on Feb. 15, 2008] Paragraph "Setup of Target cell/target eNode B".

3GPP TSG RAN WG2 #50: "Intra-AS handover procedure in LTE-ACTIVE mode with CPS" [Online] Jan. 2006, pp. 1-4, XP002469236, Sophia Antipolis, France, Retrieved from the Internet: URL:www.3gpp.org> [retrieved on Feb. 15, 2008] 2.1 Inter E-Node B Bs handover procedure.

* cited by examiner

HANDOVER OF A USER EQUIPMENT WITH FORWARDING AND REUSING A USER EQUIPMENT CONFIGURATION

FIELD OF INVENTION

The present invention relates to the field of cellular telecommunication networks. Specifically, the present invention relates to a method for handing over a User Equipment from a first base station to a second base station of a cellular telecommunication network, in particular from a first eNodeB to a second eNodeB of a Long Term Evolution network. Further, the present invention relates to a base station for a cellular telecommunication network, which is designed in such a manner, that the described method for handing over a User Equipment can be carried out.

ART BACKGROUND

Long Term Evolution (LTE) is the name given to a project within the Third Generation Partnership Project (3GPP) to improve the Universal Mobile Telecommunications System (UMTS) mobile phone standard to cope with future requirements. Goals include improving efficiency, lowering costs, improving services, making use of new spectrum opportunities, and better integration with other open standards.

LTE networks rely on Orthogonal Frequency Division Multiplexing (OFDM) as well as on Multiple-Input Multiple-Output (MIMO) antenna technologies. Based on these technologies it should be possible for cellular phone network providers to handle much more users (approximately ten time more users than UMTS) and to support not only speech data but also services such as interactive applications including high speed data transfer and Internet Protocol Television (IPTV).

The architecture of LTE networks is characterized by the fact that no central base station controller manages the handovers of a cellular mobile phone between cells being assigned to different base stations. A base station in a LTE network is called evolution NodeB (eNodeB). With a LTE cellular network the eNodeB potentially in conjugation with the cellular mobile phone decides to handover a call to a cell of another eNodeB. In the following a cellular mobile phone will also be called a User Equipment (UE).

In Wideband Code Division Multiple Access (WCDMA) networks a configuration of a UE for performing measurements such as inter-frequency measurements is defined by a Radio Network Controller (RNC) and provided to the UE. During an inter-frequency measurement the UE tunes its receiver for certain subsequent times towards a different frequency in order to detect signals from other base stations operating at different frequencies. Specifically, in WCDMA the UE measurement configuration can be divided in two configuration parts. A first part is the so called compressed mode configuration and a second part is the so called compressed mode activation. Thus, after a handover of the UE it is not necessary to completely renew the whole UE measurement configuration. Rather it is only necessary that the RNC activates the measurement configuration. Thereby, a new activation time is provided by the RNC both to the UE and to the affected new base station.

As has already mentioned above, in LTE networks there is no central base station controller which can ensure that a UE measurement configuration is provided to all base stations being involved in a handover of the UE. Therefore, in order to ensure that all base stations being involved in a handover have a knowledge of the actual measurement configuration, data representing the actual measurement configuration have to be transmitted between the UE and the new respectively the target base station via the air interface between the UE and the target base station. This has the disadvantage that the data load of the air interface will be increased.

There may be a need for providing an effective method for handing over a User Equipment from a first base station to a second base station of a cellular telecommunication network.

SUMMARY OF THE INVENTION

This need may be met by the subject matter according to the independent claims. Advantageous embodiments of the present invention are described by the dependent claims.

According to a first aspect of the invention there is provided a method for handing over a User Equipment from a first base station to a second base station of a cellular telecommunication network, in particular from a first eNodeB to a second eNodeB of a Long Term Evolution network. The provided method comprises (a) establishing a first connection between the User Equipment and the first base station, (b) arranging a current configuration of the User Equipment with the first base station, (c) forwarding the current configuration of the User Equipment from the first base station to the second base station via a terrestrial interface, (d) establishing a second connection between the User Equipment and the second base station, and (e) reusing the forwarded configuration of the User Equipment at least partially for the operation of the User Equipment, when the User Equipment is served by the second base station. According to the described handing over method a set of configuration parameters of the User Equipment is known by the first base station and the second base station as a default configuration and the current configuration of the User Equipment is forwarded from the first base station to the second base station by solely forwarding configuration parameters, which deviate from the default configuration.

This first aspect of the invention is based on the idea that a decentral transfer of information defining the configuration of a User Equipment (UE) between a first base station and a second base station significantly reduces the signaling load on air interface during a handover of the UE between different base stations. This holds in particular if one takes into account that a handover typically takes place at an edge of a cell.

The described method may provide the advantage that a UE configuration, which has already been provided to the first base station while the first base station is serving the UE, will not be lost when a handover is accomplished. Therefore, a new configuration signaling of the UE to the second base station, after a handover has been carried out, will not be necessary. Thus, the data load on the air interface between the UE and the second base station will be significantly reduced. This holds although the cellular telecommunication network respectively the components of the network being involved in the handover always have knowledge about the current UE configuration.

The term terrestrial interface refers to any communication connection between two spatially fixed points. Preferably, a terrestrial interface comprises an electrical and/or an optical cable, which extends between the first base station and the second base station. This may provide the advantage that large amounts of data can be transferred between the two base stations such that the additional data representing the current UE configuration are negligible with respect to the data load, which is transferred between neighboring base stations anyway.

By solely forwarding configuration parameters, which deviate from the default configuration, the described method may provide the advantage that the data traffic via the terrestrial interface can be significantly reduced.

According to an embodiment of the invention the default configuration depends on a service or a service class provided to the User Equipment. This may provide the advantage that depending on the type of data signals which have to be transmitted between the User Equipment and a serving base station an appropriate default configuration can be used, which allows for further reducing the data traffic via the terrestrial interface.

For instance if the User Equipment is set up for transmitting and receiving speech signals between two Users of the telecommunication network, the default configuration should be appropriately selected in order not to allow too long non-activity times, during which a data transfer is not possible. By contrast thereto, if for instance the User Equipment is set up for being connected to the Internet, the default configuration may allow longer non-activity times, because when a web page has been downloaded the user typically needs some time to read the information of this web page.

According to a further embodiment of the invention the default configuration comprises a hierarchical data structure such that by forwarding only one superordinate parameter a predefined number of configuration parameters being assigned to the superordinate parameter are defined.

This means that various pre configurations may be used for effectively forwarding the information of the current UE configuration to the second base station in a quasi compressed way. The provision of the hierarchical data structure may provide the advantage that the data traffic via the terrestrial interface can be further reduced because the transmission of solely predefined parameters can be sufficient for designating various predefined UE configurations.

According to a further embodiment of the invention the further configuration data are retrieved from the User Equipment by the second base station, whereby the further configuration data represent additional information about the current configuration of the User Equipment. The further configuration data may only be retrieved by the second base station if these data are actually needed. Therefore, such a procedure might also be called "event based measurement".

According to an embodiment of the invention the current configuration is a measurement configuration of the User Equipment characterizing measurement procedures which are performed by the User Equipment.

The measurement procedures which may be carried out by the UE may comprise any known measurement, which can be performed by a UE. For instance the measurement variable may be the signal strength of a signal being transmitted and/or received between the UE and different base stations being assigned to one or more telecommunication networks. Further, the measurement value may be represented by the quality of a transmission channel between the UE and different base stations of one or more cellular telecommunication networks. Further, the measurement value may represent an activity time, an average number of required retransmissions and/or a data throughput at a particular instance in time.

The measurement procedure of the UE might also comprise a so called inter-frequency measurement. Thereby, the UE tunes its receiver for certain subsequent times towards a different frequency in order to detect signals from other base stations operating at different frequencies.

According to a further embodiment of the invention the current configuration comprises activity data of the User Equipment, which activity data determine activity times of the User Equipment. Thereby, the activity times itself might define time periods, during which the User Equipment is deactivated for transmitting radio wave signals to a base station and/or for receiving radio wave signals from a base station.

Such an interrupted activity of the UE is known as a discontinuous reception (DRX) for the receiving case and discontinuous transmission (DTX) for the transmitting case. In other words, DRX and DTX define time patterns for activating the receiver unit and the transmitter unit of a UE, respectively. Thereby, battery power of the UE can be saved and the maximal battery operation time in particular of a rechargeable battery of the UE can be increased significantly. This holds both for the effective talk time and for the effective stand-by time of the UE.

The activation times might also be related to the above-mentioned inter-frequency measurements. During tuning the UE receiver towards a different frequency it is obvious that the UE is not able to receive data from the serving base stations. Therefore, by signalling these interruption times between the first base station and the second base station, important time information regarding the configuration of the UE is forwarded.

According to a further embodiment of the invention the activity times are used by the User Equipment as a time reference for performing measurements. This may provide the advantage that a precise reference time-frame for the measurements of the UE is provided.

According to a further embodiment of the invention the second base station transmits an activation message to the User Equipment, wherein the activation message comprises an activation time, which implies to the User Equipment that its current configuration remains valid with a new reference time. This may provide the advantage that one and the same UE configuration can be used even if a change of the reference time is accomplished.

It has to be mentioned that if instead of the activation message new configuration commands are received by the User Equipment, the old values of the previous UE configuration will be overwritten.

According to a further embodiment of the invention the forwarded configuration is used by the second base station until a re-configuration of the User Equipment is initiated. This means that a User Equipment configuration remains valid until a re-configuration, which may be initiated by the second base station and/or by the UE, is accomplished. This may provide the advantage that an accurately determined UE configuration will be reused for a long time until an updated configuration will be available.

According to a further embodiment of the invention the current configuration is forwarded via an X2 interface. This may provide the advantage that in case the above described method is carried out within an LTE network, a standardized interface between neighboring eNodeBs, which interface already exists, can be employed. This means that the described method can be realized in known telecommunication networks without having the need to modify the corresponding network architecture. Of course, in case an X2 interface is used, the structure of the data record will have to comply with the standardized X2 requirements.

It has to be mentioned that if the X2 interface is not in operation the UE configuration has to be transferred via known S1 interfaces between different base stations for instance via an access Gateway and an IP based network.

According to a further aspect of the invention there is provided a first base station for a cellular telecommunication network. The first base station comprises (a) a connection unit for establishing a first connection to a User Equipment, (b) a receiving unit for receiving a current configuration of the User Equipment from the User Equipment, (c) a transmission unit for forwarding the current configuration of the User Equipment from the first base station to the second base station via a terrestrial interface and (d) a memory unit (214) for storing configuration parameters of the User Equipment (180), which configuration parameters represent a default configuration. Thereby, the current configuration is suitable for to be reused at least partially for the operation of the User Equipment, when the User Equipment is served by the second base station.

This aspect of the invention is based on the idea that the provided base station can be used for carrying out the above described information forwarding method in an effective way.

By employing the described first base station a decentral transfer of information defining the configuration of a User Equipment (UE) between a first base station and a second base station can be accomplished. This significantly reduces the signaling load on the air interface during a handover of the UE between the first base station and the second base station.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered to be disclosed with this application.

The aspects defined above and further aspects of the present invention are apparent from the example of embodiment to be described hereinafter and are explained with reference to the example of embodiment. The invention will be described in more detail hereinafter with reference to examples of embodiment but to which the invention is not limited.

DETAILED DESCRIPTION

Figure 1:
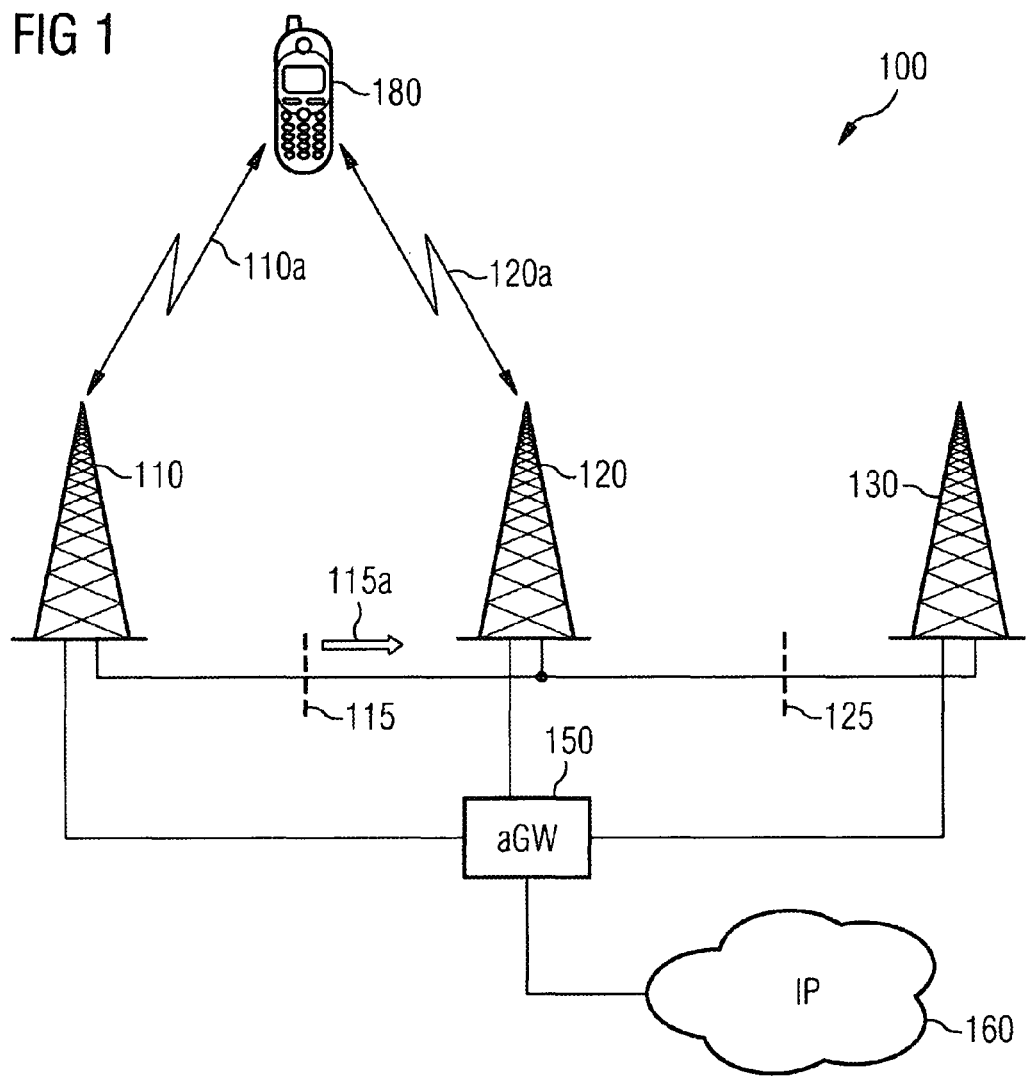
FIG. 1 illustrates a forwarding of a current configuration of the User Equipment from a first base station to a second base station via a terrestrial X2 interface.

The illustration in the drawing is schematically. It is noted that in different figures, similar or identical elements are provided with reference signs, which are different from the corresponding reference signs only within the first digit.

FIG. 1 shows a Long Term Evolution (LTE) network 100 comprising a plurality of base stations, wherein only a first eNodeB 110, a second eNodeB 120 and a third eNodeB 130 are depicted. Neighboring eNodeBs 110, 120 and 120, 130 are connected with each other via a standardized X2 interface 115 and 125, respectively.

The base stations 110, 120 and 130 are further connected to an access gateway 150. User data between a User Equipment (UE) 180 and a further UE (not depicted) are transferred via an access Gateway (aGW) 150 and via an IP based network 160. According to the embodiment described here the UE 180 is a cellular mobile phone. However, it has to be mentioned that the UE 180 may also be any type of communication terminal such as a Personal Digital Assistant (PDA), a Notebook computer and/or any other movable communication device.

The UE 180 is initially connected to the first eNodeB 110 via a first connection respectively a first transmission path 110a. At that time the second eNodeB 120 is not yet involved in the communication between the UE 180 and the not depicted further UE.

During operation the UE 180 performs a plurality of measurement procedures. These measurement procedures are carried out in order to put the UE 180 in an appropriate configuration in accordance with a configuration of the serving first eNodeB 110. This means that for instance the UE 180 regularly checks whether there are other base stations accessible. Thereby, the UE 180 might search for accessible base stations of the LTE network 100 or of other cellular communication networks such as for instance a Universal Mobile Telecommunications System (UMTS) and/or a Global System for Mobile Communications (GSM) network. When searching for other accessible base stations the measurement variable may be the signal strength of a signal being transmitted and/or received between the UE and a corresponding foreign base station.

In order to provide for an error free data transfer via the first connection 110a it is necessary that the first eNodeB 110 has knowledge about the type of measurement and in particular about the time the measurement procedures are performed. Therefore, a current measurement configuration of the UE 180 is provided to the first base eNodeB 110.

During a handover of the UE 180 from the first eNodeB 110 to the second eNodeB 120, wherein a second connection via a second transmission path 120a is established and the first connection via the first transmission path 110a is terminated, the current measurement configuration of the UE 180 is transferred from the first eNodeB 110 to the second eNodeB 120 via the X2 interface 115. This forwarding is indicated by the arrow denominated with the reference numeral 115a.

However, when forwarding the current measurement configuration of the UE 180, not all parameters, which define the current measurement configuration, have to be forwarded to the second eNodeB 120. However, also an accordingly reduced dataset can carry the full information of the UE measurement configuration, if a set of configuration parameters of the User Equipment 180 is known by the first eNodeB 110, the second eNodeB 120 and also by the third eNodeB 130 as a default configuration. In that case only these parameter, which deviate from the default configuration have to be forwarded from the eNodeB 110 to the second eNodeB 120.

According to the embodiment described here, the current measurement configuration comprises activity data of the UE 180, which activity data determine activity times of the User Equipment. Thereby, the activity times itself might define time periods, during which the UE 180 is deactivated for transmitting radio wave signals to the second eNodeB 120 and/or for receiving radio wave signals from the second eNodeB 120.

As has already been mentioned above, such an interrupted activity of the UE 180 is known as a discontinuous reception (DRX) for the receiving case and discontinuous transmission (DTX) for the transmitting case. Thereby, battery power of the UE 180 can be saved and the maximal battery operation time in particular of a rechargeable battery of the UE 180 can be increased significantly.

According to the embodiment described here, the activation times might also be related to the above-mentioned inter-frequency measurements. During tuning the receiver of the UE 180 towards a different frequency the UE 180 is not able to receive data from the currently serving eNodeB 120. Therefore, by signaling these interruption times between the first eNodeB 110 and the second eNodeB 120, important time information regarding the measurement configuration of the UE 180 is forwarded.

The forwarding of the condensed information is carried out during a handover preparation for the UE 180 from the first eNodeB 110 to the second eNodeB 120. This provides the possibility that the measurement configuration of the UE 180 will be available for the second eNodeB 120 as soon as the second connection between the UE 180 and the second eNodeB 120 has been established.

It has to be mentioned that the described forwarding of the measurement configuration of the UE 180 can also be carried out between the second eNodeB 120 and the third eNodeB 130.

It has to be further mentioned that the invention is not limited to a telecommunication network, which interacts with an IP based network. The invention can rather be realized by means of any other network.

Figure 2:
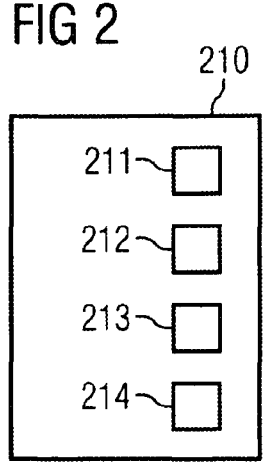
FIG. 2 shows a base station, which comprises a connection unit, a receiving unit and a transmitting unit.

FIG. 2 shows a first eNodeB 210, which in conjugation with at least one another eNodeB 220, 230 is adapted for performing the above described method for handing over the UE 180 between different base stations 110, 210, 120. The first eNodeB 210 comprises a connection unit 211 for establishing a first connection to the UE 180, a receiving unit 212 for receiving a current configuration of the UE 180 from the UE 180, a transmission unit 213 for forwarding the current configuration of the UE 180 from the first eNodeB 110, 210 to the second eNodeB 120 via the terrestrial X2 interface 115 and a memory unit 214 for storing configuration parameters of the User Equipment 180, which configuration parameters represent the default configuration.

It should be noted that the term "comprising" does not exclude other elements or steps and the "a" or "an" does not exclude a plurality. It should also be noted that reference signs in the claims should not be construed as limiting the scope of the claims.

LIST OF REFERENCE SIGNS

100 LTE telecommunication network
110 first base station/first eNodeB
110a first connection/first transmission path
115 X2 interface
115a forwarding UE measurement configuration
120 second base station/second eNodeB
120a second connection/second transmission path
125 X2 interface
130 third base station/third eNodeB
150 access Gateway
160 IP based network
180 User Equipment/mobile phone
210 first base station/first eNodeB
211 connection unit
212 receiving unit
213 transmission unit
214 memory unit

The invention claimed is:

1. A method for handing over a User Equipment from a first base station to a second base station of a cellular telecommunication network, in particular from a first eNodeB to a second eNodeB of a Long Term Evolution network, the method comprising:

establishing a first connection between the User Equipment and the first base station;

arranging a current configuration of the User Equipment with the first base station;

forwarding the current configuration of the User Equipment from the first base station to the second base station via a terrestrial interface;

establishing a second connection between the User Equipment and the second base station; and reusing the forwarded configuration of the User Equipment at least partially for the operation of the User Equipment, when the User Equipment is served by the second base station, wherein a set of configuration parameters of the User Equipment is known by the first base station and the second base station as a default configuration; and the current configuration of the User Equipment is forwarded from the first base station to the second base station by solely forwarding configuration parameters, which deviate from the default configuration.

2. The method as set forth in claim 1, wherein the default configuration depends on a service or a service class provided to the User Equipment.

3. The method as set forth in claim 1, wherein the default configuration comprises a hierarchical data structure such that by forwarding only one superordinate parameter a predefined number of configuration parameters being assigned to the superordinate parameter are defined.

4. The method as set forth in claim 1, wherein further configuration data are retrieved from the User Equipment by the second base station, whereby the further configuration data represent additional information about the current configuration of the User Equipment.

5. The method as set forth in claim 1, wherein the current configuration is a measurement configuration of the User Equipment characterizing measurement procedures which are performed by the User Equipment.

6. The method as set forth in claim 1, wherein the current configuration comprises activity data of the User Equipment, which activity data determine activity times of the User Equipment.

7. The method as set forth in claim 6, wherein the activity times are used by the User Equipment as a time reference for performing measurements.

8. The method as set forth in claim 7, wherein the second base station transmits an activation message to the User Equipment, wherein the activation message comprises an activation time, which implies to the User Equipment that its current configuration remains valid with a new reference time.

9. The method as set forth in claim 1, wherein the forwarded configuration is used by the second base station until a re-configuration of the User Equipment is initiated.

10. The method as set forth in claim 1, wherein the current configuration is forwarded via an X2 interface.

11. A first base station for a cellular telecommunication network, the first base station comprising:

a connection unit for establishing a first connection to a User equipment;

a receiving unit for receiving a current configuration of the User Equipment from the User equipment;

a transmission unit for forwarding the current configuration of the User Equipment from the first base station to a second base station via a terrestrial interface; and a memory unit for storing configuration parameters of the User Equipment, which configuration parameters represent a default configuration, characterized by forwarding the current configuration information of the User Equipment by solely forwarding configuration parameters which deviate from the default configuration.

12. A method comprising:
arranging a current configuration of the user equipment with the first base station; and
establishing a first connection between a user equipment and a first base station;
during handing over the user equipment from the first base station to a second base station, forwarding the current configuration of the user equipment from the first base station to the second base station via a terrestrial interface,
where forwarding the current configuration information comprises solely forwarding configuration parameters which deviate from a default configuration.

13. The method as set forth in claim 12, wherein the default configuration depends on a service or a service class provided to the user equipment.

14. The method as set forth in claim 12, wherein the default configuration comprises a hierarchical data structure such that by forwarding only one superordinate parameter a predefined number of configuration parameters being assigned to the superordinate parameter are defined.

15. The method as set forth in claim 12, wherein the current configuration is a measurement configuration of the user equipment characterizing measurement procedures which are performed by the user equipment.

16. The method as set forth in claim 12, wherein the current configuration comprises activity data of the user equipment, where the activity data determines activity times of the user equipment.

17. The method as set forth in claim 16, wherein the activity times are a time reference for when the user equipment performs measurements.

18. The method as set forth in claim 12, wherein the terrestrial interface is an X2 interface.

19. The method as set forth in claim 12, further comprising terminating the first connection.

20. The method as set forth in claim 12, where the first base station is an eNodeB of a Long Term Evolution network.

* * * * *